(12) United States Patent
Wedlake et al.

(10) Patent No.: US 8,171,075 B2
(45) Date of Patent: May 1, 2012

(54) GENERATING HINTS FOR MORE OPTIMAL PROCESSING OF REQUESTS FOR INFORMATION WITHIN AN ENVIRONMENT IN WHICH RESOURCES ARE ABSTRACTED USING A MODEL

(75) Inventors: Martine B. Wedlake, Hillsboro, OR (US); Ross E. Hagglund, Hillsboro, OR (US); Arthur J. Colvig, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/484,218

(22) Filed: Jun. 14, 2009

(65) Prior Publication Data
US 2010/0318597 A1   Dec. 16, 2010

(51) Int. Cl.
*G06F 15/16* (2006.01)
(52) U.S. Cl. ...................................... 709/203
(58) Field of Classification Search .................. 709/233, 709/239, 242; 370/252, 389, 238
See application file for complete search history.

(56) References Cited

U.S. PATENT DOCUMENTS

| 7,181,516 B2* | 2/2007 | Kaneda et al. | 709/223 |
| 7,216,263 B2* | 5/2007 | Takaoka et al. | 714/47.2 |
| 2003/0200357 A1 | 10/2003 | Yanosy | |
| 2004/0049565 A1 | 3/2004 | Keller et al. | |
| 2004/0117369 A1 | 6/2004 | Mandal et al. | |
| 2005/0182843 A1* | 8/2005 | Reistad et al. | 709/230 |
| 2007/0055842 A1* | 3/2007 | Abe et al. | 711/170 |
| 2008/0033972 A1 | 2/2008 | Yin et al. | |
| 2008/0062895 A1 | 3/2008 | Chapman et al. | |
| 2008/0263259 A1* | 10/2008 | Sadovsky et al. | 711/100 |

\* cited by examiner

*Primary Examiner* — Joseph Avellino
*Assistant Examiner* — Mark O Afolabi
(74) *Attorney, Agent, or Firm* — Feb C. Cabrasawan

(57) ABSTRACT

An information technology (IT) environment includes IT managed resources in which the resources are abstracted using a model. In response to determining that a request for information received from a client is non-optimal in terms of processing the request, a first hint can be constructed that indicates how future requests are to be formulated by the client so that they are more optimal in terms of processing the future requests. In response to determining that the information is internally structured non-optimally in terms of processing the request, a second hint can be constructed that indicates how the information is to be internally structured more optimally in terms of processing future requests. In response to determining that processing the request will be non-optimal, a third hint can be constructed relating to a characteristic that results in non-optimal processing of the request, and logged within a hint log for offline analysis.

20 Claims, 5 Drawing Sheets

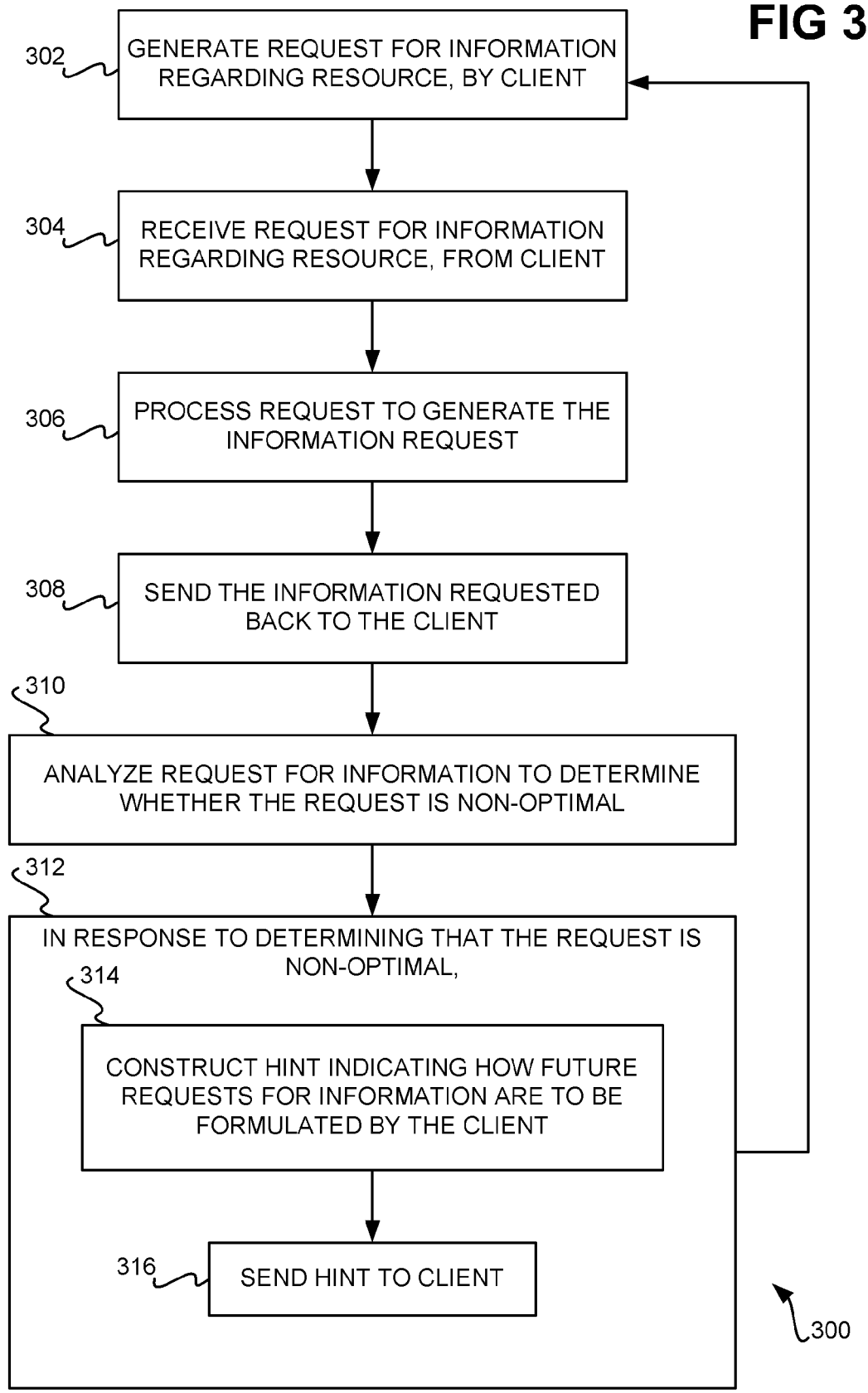

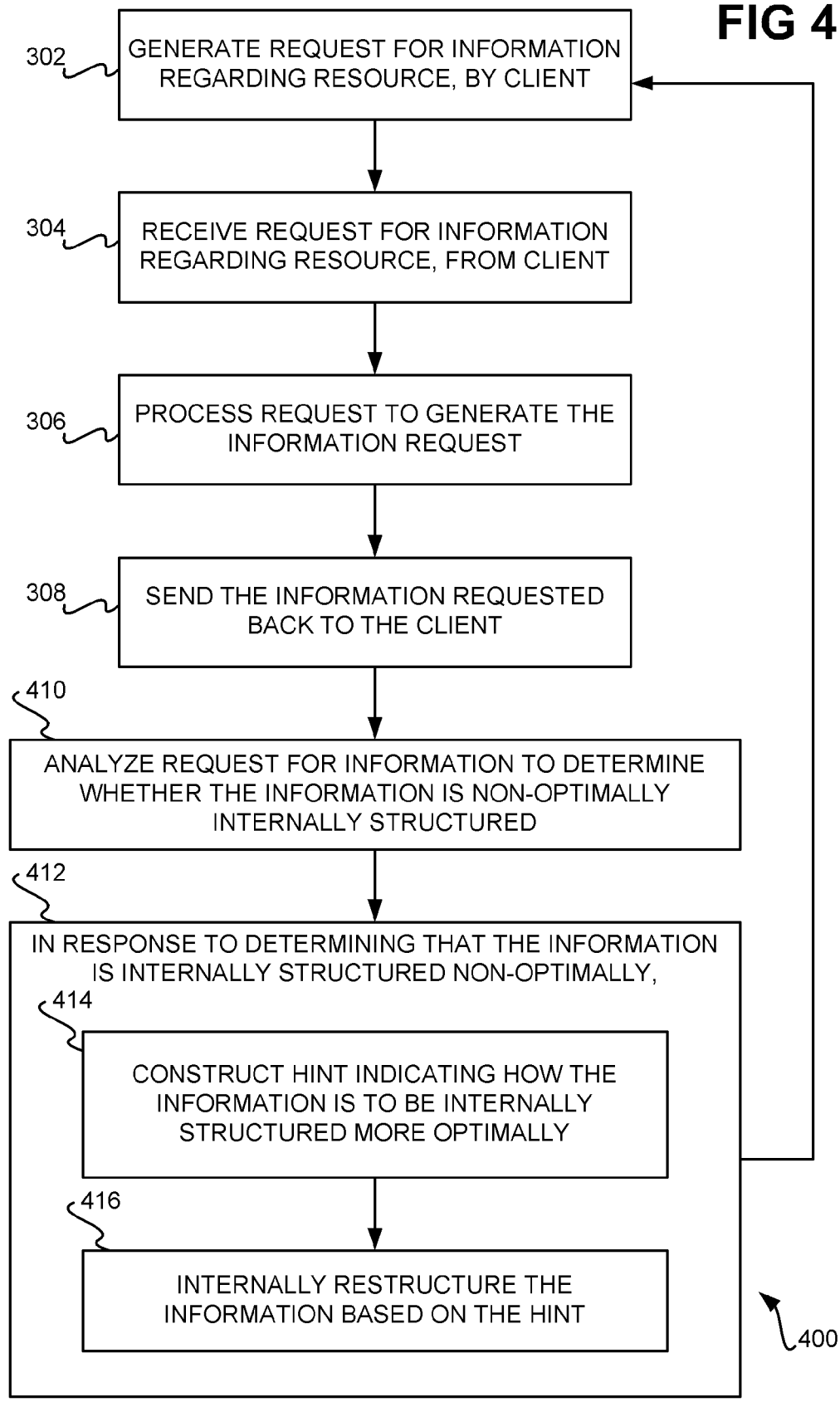

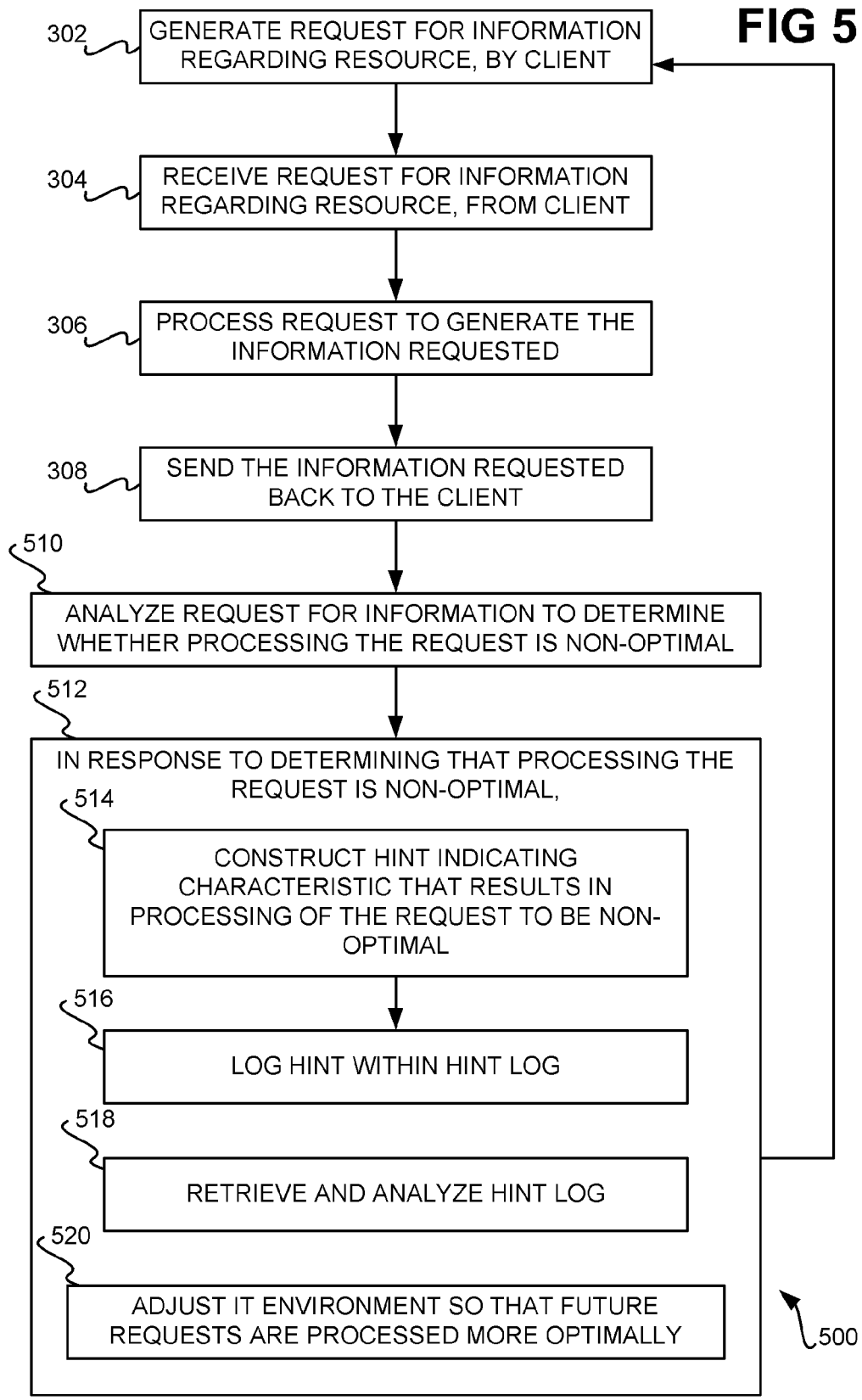

GENERATING HINTS FOR MORE OPTIMAL PROCESSING OF REQUESTS FOR INFORMATION WITHIN AN ENVIRONMENT IN WHICH RESOURCES ARE ABSTRACTED USING A MODEL

FIELD OF THE INVENTION

The present invention relates generally to an information technology (IT) environment having a number of IT managed resources in which the resources are abstracted using a model, such as the Common Information Model (CIM). More specifically, the invention relates to generating hints for more optimal processing of requests for information regarding such resources.

BACKGROUND OF THE INVENTION

Large-scale enterprises, and other organizations, typically have information technology (IT) environments in which there are a number of resources to be managed. These resources can include hardware resources, such as server computing devices, storage devices and subsystems, and other types of hardware and other resources. Because the number of these resources can be relatively large, managing them in an efficient manner is important for the everyday running of the IT environment as a whole.

One way in which the IT resources can be managed within an IT environment is to abstract the resources using a model. Managing IT resources within an IT environment by using a model in which the resources are abstracted as objects can require requesting information regarding the resources. By requesting such information the capabilities and characteristics of the resources can be learned. As a result, the resources that populate a given IT environment can be determined, so that efficient management of these resources can be achieved.

SUMMARY OF THE INVENTION

The present invention relates to generating hints for more optimal processing of requests for information within an environment in which resources are abstracted using a model. A method of an embodiment of the invention is operable within an information technology (IT) environment having a number of IT managed resources in which the IT managed resources are abstracted using a model. The method is implemented by computer-executable instructions that are executed by one or more processors. The method receives a request for information regarding an IT managed resource of the IT environment. The request is received from a client. The request is analyzed to determine whether the request is non-optimal in terms of processing the request to generate the information requested. In response to determining that the request is non-optimal, a hint is constructed and sent to the client. The hint indicates how future requests for information are to be formulated by the client so that they are more optimal in terms of processing them to generate the information requested.

An IT environment of an embodiment of the invention includes a number of IT managed resources and an agent running on a selected resource. The resources are abstracted using a model, and at least one of the resources is a hardware resource, such as a server computing device, a storage device or subsystem, or another type of resource. The agent is to store information regarding the selected resource. The agent is to receive a request for the information from a client, and to determine whether the information is internally structured by the agent non-optimally in terms of processing the request to generate the information requested. The agent is to construct a hint indicating how the information is to be internally structured more optimally in terms of processing future requests for the information to generate the information requested, and to internally restructure the information within the agent based on the hint constructed.

A computer-readable medium of an embodiment of the invention has one or more computer programs stored thereon for execution by one or more processors to perform a method. The computer-readable medium may be a tangible computer-readable medium, such as a recordable data storage medium. The method is operable within an IT environment having a number of IT managed resources in which the IT managed resources are abstracted using a model. The method is performed by an agent running within the IT environment.

A request is received for information regarding an IT managed resource of the IT environment, from a client. The request is analyzed to determine whether it is non-optimal in terms of processing the request to generate the information requested. In response to determining that the request is non-optimal, a first hint is constructed and sent to the client. The first hint indicates how future requests for information are to be formulated by the client so that they are more optimal in terms of processing them to generate the information requested.

The request is further analyzed to determine whether the information is internally structured by the agent non-optimally in terms of processing the request by the agent to generate the information requested. In response to determining that the information is internally structured by the agent non-optimally, a second hint is constructed. The second hint indicates how the information is to be internally structured by the agent more optimally in terms of processing the future requests for the information by the agent to generate the information requested. The information is then internally restructured by the agent based on the second hint constructed.

The request is also analyzed to determine whether processing the request to generate the information requested will be non-optimal. In response to determining that processing the request to generate the information requested will be non-optimal, a third hint is constructed and logged within a hint log for offline analysis by a network administrator. The third hint relates relating to a characteristic that results in processing of the request to generate the information requested to be non-optimal.

Other aspects and embodiments of the present invention will become readily apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is flowchart of a method for processing a request and generating a hint of a first type, according to an embodiment of the present invention.

FIG. 4 is flowchart of a method for processing a request and generating a hint of a second type, according to an embodiment of the present invention.

FIG. 5 is flowchart of a method for processing a request and generating a hint of a third type, according to an embodiment of the present invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

For efficient resource management to occur within an information technology (IT) environment in which the IT managed resources are abstracted using a model like the Common Information Model (CIM), requests for information regarding the resources should be processed efficiently within the IT environment. The CIM is an open standard that defines how managed resources within an IT environment are represented as a common set of objects and relationships among them. The CIM provides for consistent management of these managed resources, regardless of their manufacturers or providers.

However, models such as the CIM permit such information to be requested in a plethora of different ways. Some manners by which information can be requested may be more efficiently (i.e., optimally) processed than other manners. Furthermore, a manner by which information can be requested efficiently in one environment may not be efficient in another environment.

Embodiments of the invention overcome these problems by providing hints that can result in subsequent (i.e., future) requests for information being processed more efficiently (i.e., optimally). By taking actions based on these hints, processing subsequent requests for information regarding the managed resources is achieved more efficiently. As such, the IT environment as a whole is managed in a more optimal manner, without having to increase the amount of processing resources, for instance, available within the IT environment to process the requests.

Hint Generation and Usage Overview

Figure 1:
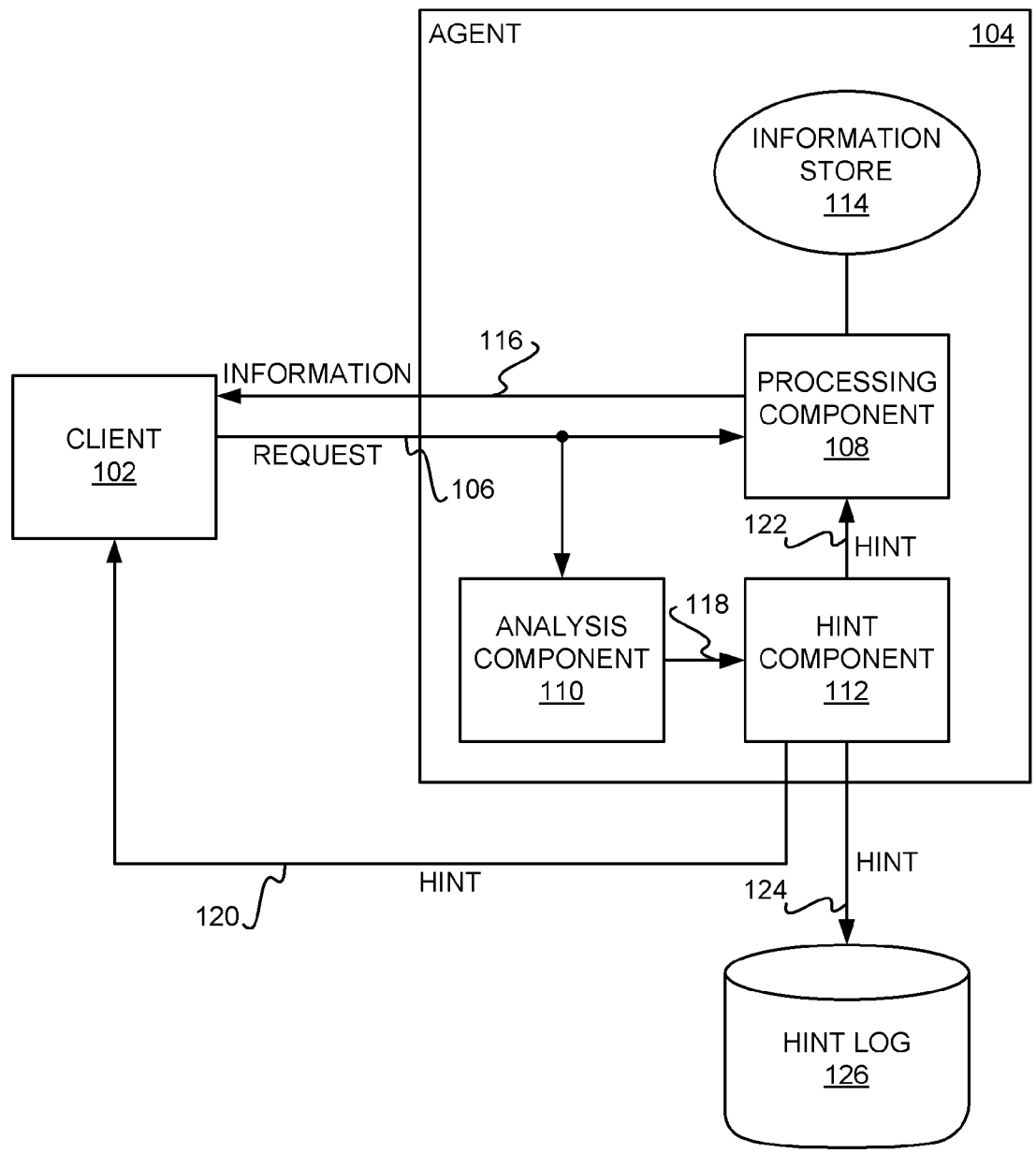
FIG. 1 is a diagram depicting how hints for more optimal processing of requests for information are generated and used, according to a general embodiment of the present invention.

FIG. 1 shows how hints are generated and used, according to a general embodiment of the invention. There is a client 102 and an agent 104. The client 102 is a client of a model, such as the Common Information Model (CIM), by which resources of an information technology (IT) environment are managed. The agent 104 is an agent of the model, and may run on a selected IT managed resource of the IT environment. As such, both the client 102 and the agent 104 may in one embodiment by implemented in software, hardware, or a combination of software and hardware.

The client 102 generates a request for information regarding the selected IT managed resource of the IT environment, and sends the request to the agent 104, as indicated by the arrow 106. The agent 104 thus receives the request. The agent 104 includes a processing component 108, an analysis component 110, and a hint component 112. The components 108, 110, and 112 may be implemented in software, hardware, or a combination of software and hardware.

The processing component 108 processes the request to generate the information requested by the client 102. As such, the processing component 108 has access to an information store 114 managed or otherwise available to the agent 104. The information store 114 stores information regarding the managed resource on which the agent 104 is running, and may also store other types of information. The processing component 108 sends the information that has been generated back to the client 102, as indicated by the arrow 116.

The analysis component 110 performs analyses, on which basis the hint component 112 generates three different types of hints. First, the analysis component 110 analyzes the request to determine whether the request is non-optimal in terms of processing the request by the processing component 108 to generate the information requested. The analysis component 110 sends the results of this analysis to the hint component 112, as indicated by the arrow 118. The hint component 112 constructs a hint indicating how future requests for information can be formulated by the client 102 so that these future requests are more optimal (as compared to the original request denoted by the arrow 116) in terms of processing to generate the information requested. The hint component 112 sends this first type of hint back to the client 102, as indicated by the arrow 120.

Therefore, the first type of hint indicates how future requests for information can be formulated so that they are more optimal in terms of processing them to generate the information requested. For example, the client 102 that generates such requests is provided such a hint. The hint may inform the client 102 of the given manner by which information can be requested so that the request is more optimal (i.e., more efficiently processed) in terms of processing such a request for information, as compared to another manner by which the same information can be requested.

Second, the analysis component 110 analyzes the request to determine whether the information is internally structured (i.e., as stored within the information store 114) by the agent 104 non-optimally in terms of processing the request by the processing component 108 to generate the information requested. The analysis component 110 sends the results of this analysis to the hint component 112 as well, as indicated by the arrow 118. It is noted that this analysis may be the same analysis or a different analysis than that which has been described above as to the first type of hint. The hint component 112 constructs a hint indicating how the information can be internally structured by the agent 104 more optimally (as compared to how the information is currently internally structured) within the information store 114 in terms of processing future requests for the information to generate the information. The hint component 112 sends this second type of hint to the processing component 108, as indicated by the arrow 122.

Therefore, the second type of hint indicates how information can be internally structured within the IT environment itself in terms of processing future requests for the information to generate the information requested. For example, the agent 104 running within the IT environment may internally restructure the information based on such a hint As such, subsequent requests for the information that are received from clients like the client 102 are processed more optimally (i.e., more efficiently), due to this internal restructuring of how the information is stored by the agent within the IT environment.

Both the first and the second types of hints are acted upon substantially instantaneously or immediately, such that they are immediate, dynamic, or online hints. For example, as soon as the client 102 receives a hint of the first type, it can formulate or generate subsequent requests for information in accordance with this hint. Likewise, as soon as the processing component 108 receives a hint of the second type, it can internally restructure the information within the information store 114 in accordance with this hint.

Third, the analysis component 110 analyzes the request to determine whether processing the request by the processing component 108 to generate the information requested will be non-optimal. The analysis component 110 sends the results of this analysis to the hint component 112, too, as indicated by the arrow 118. This analysis may also be the same analysis or a different analysis than that which has been described above as to the first and the second types of hints. The hint component 112 constructs a hint that relates to a characteristic that results in processing of the request to generate the information requested. The hint component 112 stores this information within a hint log 126, as indicated by the arrow 124, where the hint log 126 is stored on a non-volatile computer-readable medium, such as a hard disk drive in one embodiment.

Therefore, the third type of hint relates to one or more characteristics that results in processing of a received request for information regarding a resource to be non-optimal. Such a hint is logged within the hint log 126 for subsequent offline analysis by a network administrator. The network administrator can analyze the hints and make adjustments to the IT managed resources in question when they are taken offline, so that future requests for information from the client 102 are processed more optimally once the resources are brought back online. The third type of hint differs from the first and the second types of hints in that it is acted on later, instead of being acted upon in a substantially instantaneous, immediate, dynamic, or online manner as the first and the second types of hints can be.

The third type of hint may, however, represent the same information contained in the first and the second types of hints. In the most simplistic embodiment, the hints of the first and the second types are simply logged within the hint log 126 as the third type of hint. The characteristics to which hints of the third type relate may thus include the manners by which information is requested by the client 102 so that these requests are processed more efficiently by the agent 104, as compared to other manners by which this same information can be requested by the client 102. The characteristics to which hints of the third type relate may thus also include the manners by which the information can be structured by the agent 104 so that requests for the information are processed more efficiently, as compared to other manners by which this information can be structured.

The term "optimal" is used herein to indicate one or more different measures by which requests for information are processed by the agent 104 to generate this information. For example, a more optimal request for such information is processed more optimally than a less optimal request. Likewise, a more optimal structuring of the information permits a request for the information to be processed more optimally than a less optimal request. Optimality may thus include efficiency, such as the length of time it takes to process a given request for information. The less time incurred in processing a request for information, the more efficient and thus more optimal such processing is. Efficiency may alternatively or additionally include the extent to which resources are used to process a given request for information. The lesser the extent to which resources are used to process a request for information, the more efficient and thus more optimal such processing is.

It is further noted that the hints can be formatted in any of a number of different ways. For example, in one embodiment, the hints may be formatted in eXtended Markup Language (XML), in accordance with a prespecified XML schema. An example of such an XML schema is the CIM-XML schema specified by the CIM, as can be appreciated by those of ordinary skill within the art.

Technical Background of Representative IT Environment

Figure 2:
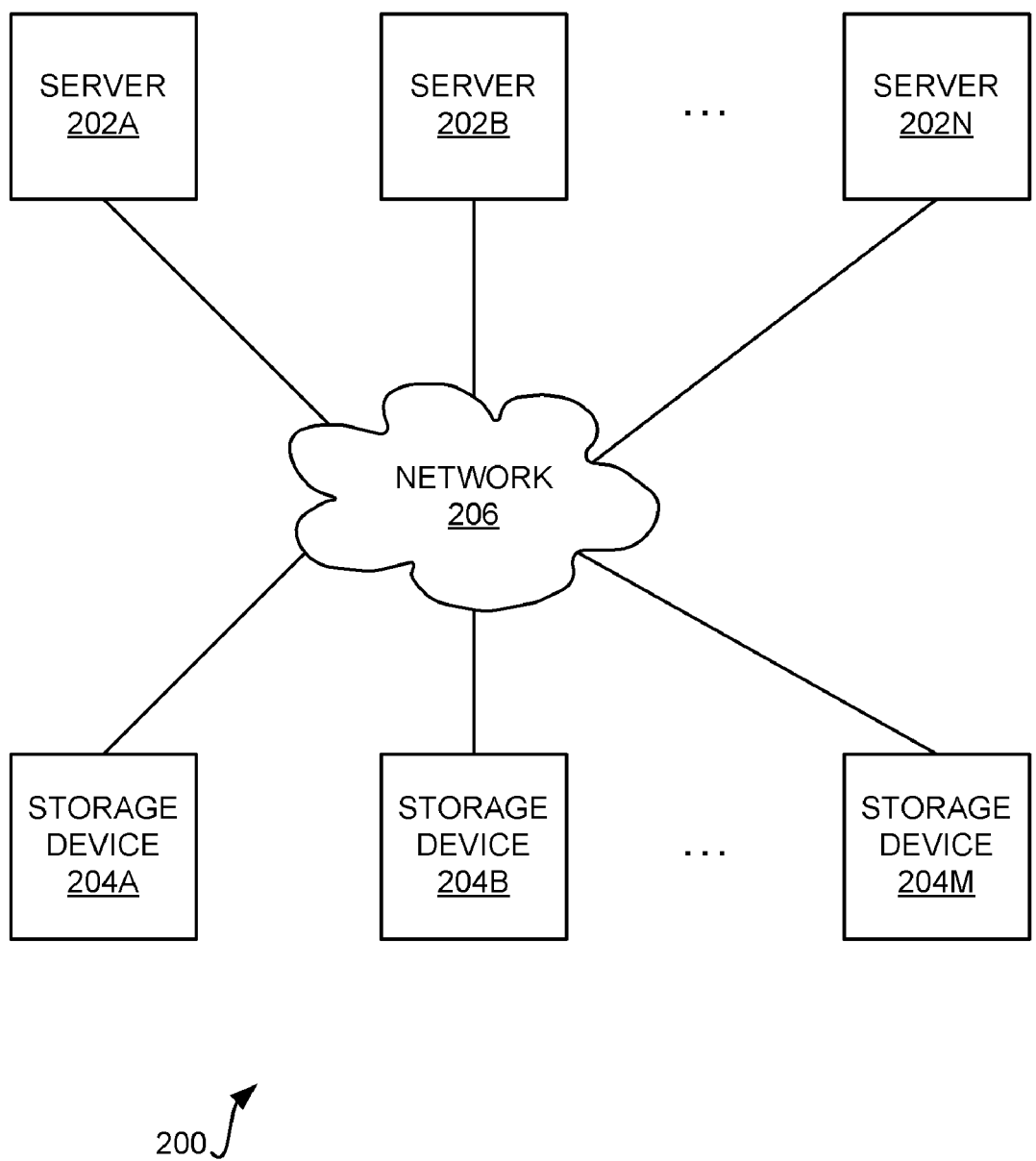
FIG. 2 is a diagram of a representative information technology (IT) environment, according to an embodiment of the present invention.

FIG. 2 shows a representative information technology (IT) environment 200, according to an embodiment of the present invention, in relation to which the hints described above can be generated and used. The IT environment 200 is depicted in FIG. 2 as including a number of servers 202A, 202B, . . . , 202N, collectively referred to as the servers 202, and a number of storage devices 204A, 204B, . . . , 204M, collectively referred to as the storage devices 204. The servers 202 and the storage devices 204 are interconnected with one another via a network 206. The servers 202 and the storage devices 204 are examples of IT managed resources within the IT environment 200. The IT environment 200 may include other types of IT managed resources, in addition to and/or in lieu of the servers 202 and the storage devices 204.

The servers 202 are server computing devices, and may each include processors, memory, and other types of hardware components. The storage devices 204 may each include one or more storage components like hard disk drives, and may be separate storage subsystems or systems in one embodiment. The network 206 can encompass a wired network, a wireless network, a local-area network (LAN), a wide-area network (WAN), a telephony network, an intranet, an extranet, and/or the Internet, among other types of networks.

The IT managed resources within the IT environment 200 are abstracted using a model, such as the Common Information Model (CIM). In accordance with such a model. each of the IT managed resources, such as each of the servers 202 and the storage devices 204, may be represented by one or more objects. Connections and other relationships among the IT managed resources are represented within the model as relationships among the objects representing the resources themselves.

The agent 104 of FIG. 1 may reside on any of the IT managed resources within the IT environment 200. In one embodiment, each IT managed resource has its own agent 104. The client 102 of FIG. 1 may be a separate client computing device that can communicate with the IT managed resources of the IT environment 200, or it may be a software component that is executed within the environment 200, such as within a virtual machine running on one or more of the servers 202. The hint log 126 may be stored over one or more of the storage devices 204 in one embodiment.

Methods as to Different Types of Hints

FIG. 3 shows a method 300 for performance in relation to FIGS. 1 and 2 as to the first type of hint that has been described, according to an embodiment of the invention. The client 102 generates a request for information regarding one of the managed resources within the information technology (IT) environment 200 (302), and sends the request to the agent 104, which receives the request (304). The processing component 108 of the agent 104 processes the request to generate the information requested (306), and sends the requested information back to the client 102 (308).

The analysis component 110 of the agent 104 analyzes the request for information to determine whether the request is non-optimal in terms of processing the request to generate the information requested by the processing component 108 (310). In response to determining that the request is indeed non-optimal, the analysis component 110 sends the results of its analysis to the hint component 112 of the agent 104, which performs the following (312). First, the hint component 112 constructs a hint of the first type, which indicates how future requests for information are to be formulated by the client (314). The hint component 112 then sends the hint back to the client 102 (316), which thus receives the hint.

The method 300 may be repeated at part 302. In the case where the method 300 is repeated after a hint has been constructed and sent to the client 102, the second request that the client generates for information regarding the managed resource is generated based on the hint that has been received. As such, the processing component 108 processes this second request more optimally than the initial (i.e., first) request, due to the second request having been generated by the client 102 based on the hint constructed in response to determining that the initial request was non-optimal.

FIG. 4 shows a method 400 for performance in relation to FIGS. 1 and 2 as to the second type of hint that has been described, according to an embodiment of the invention. Like-numbered parts in FIGS. 3 and 4 indicate that the functionalities of those parts are performed at least substantially identically in FIG. 4 as compared to as in FIG. 3. As such, the client 102 again generates a request for information regarding one of the managed resources within the information technology (IT) environment 200 (302), and again sends the request to the agent 104, which receives the request (304). The processing component 108 of the agent 104 again processes the request to generate the information requested (306), and again sends the requested information back to the client 102 (308).

The analysis component 110 of the agent 104 analyzes the request for information to determine whether the information requested is internally structured by the agent 104 non-optimally in terms of processing the request by the processing component 108 to generate this information (410). In response to determining that the information is internally structured non-optimally, the analysis component 110 sends the results of its analysis to the hint component 112 of the agent 104, which performs the following (412). The hint component 112 constructs a hint of the second type, which indicates how the information is to be internally structured by the agent more optimally (414), and sends the hint to the processing component 108, which internally restructures the information based on the hint received (416).

The method 400 may be repeated at part 302. In the case where the method 400 is repeated after a hint has been constructed and the information internally restructured on the basis of this hint, the second request that the client 102 generates for information regarding the managed resource is processed by the processing component 108 more optimally than the first request is. This is because between receipt of the first and the second requests, the agent 104 has internally restructured the requested information so that processing such requests is performed more optimally to generate the information requested.

FIG. 5 shows a method 500 for performance in relation to FIGS. 1 and 2 as to the second type of hint that has been described, according to an embodiment of the invention. Like-numbered parts in FIGS. 3 and 5 indicate that the functionalities of those parts are performed at least substantially identically in FIG. 5 as compared to as in FIG. 3. As such, the client 102 again generates a request for information regarding one of the managed resources within the information technology (IT) environment 200 (302), and again sends the request to the agent 104, which receives the request (304). The processing component 108 of the agent 104 again processes the request to generate the information requested (306), and again sends the requested information back to the client 102 (308).

The analysis component 110 of the agent 104 analyzes the request for information to determine whether processing the request by the processing component 108 was, is, or will be non-optimal (510), depending on whether part 510 is performed after, concurrently with, or before part 306, respectively. In response to determining that such processing was, is, or will be non-optimal, the analysis component 110 sends the result of its analysis to the hint component 112 of the agent 104, which performs the following (512). The hint component 112 constructs a hint of the third type, which relates to a characteristic that resulted, results, or will result in processing of the request by the processing component 108 to be non-optimal (514).

As noted above, this hint may be or include a hint of the first or the second type that has been described. As such, the hint may indicate how future requests for information can be formulated by the client 102 so that the future requests can be processed more optimally to generate the information requested. Likewise, the hint may alternatively or additionally indicate how the information can be internally structured so that they future requests for the information can be processed more optimally to generate the information requested.

The hint component 112 logs the hint in the hint log 126 (516). At some later point in time, the network administrator may take the IT managed resource(s) in question offline, and retrieve and analyze the hint log 126 (518), including the hint that has been constructed. As a result of the network administrator's analysis, the administrator can adjust the IT environment 200 on the basis of the hints constructed and logged within the hint log 126, so that future requests for information are processed more optimally by the agent 104 (520).

The method 500 may be repeated at part 302. In the case where the method 500 is repeated after a hint has been constructed and the IT environment 200 adjusted based on the hint log 126 including this hint, the second request that the client 102 generates for information regarding the managed resource is processed by the processing component 108 more optimally than the first request is. This is because between receipt of the first and the second requests by the agent 104, the network administrator has adjusted the IT environment 200 so that such processing is performed more optimally to generate the information requested.

Further Background Regarding CIM, Specific Example Relating to CIM, and Conclusion The CIM support basic operations, including enumerateInstances, enumerateInstanceNames, getInstance, getProperty, associators, references, and referenceNames. The operation enumerateInstances retrieves all the instances of a given class of object, such as a given class of storage volumes. The operation enumerateInstanceNames, by comparison, retrieves just the CIM object paths (i.e., the unique identifiers) of the instances, without returning any properties thereof. The operation getInstance returns all the properties of a given CIM object path, whereas the operation getProperty returns a single property for a given CIM object path and property name.

The operation associators identifies instances that are linked to a given CIM object path, where instances can be related to one another via associations. For example, a logical storage volume may be created from a pool of storage devices. The operation references returns instances of associations themselves. Finally, the operation referenceNames returns CIM object paths of the associations, and not all the properties of such objects.

There are thus many ways for a client operative in the CIM to request the same type of information. Furthermore, in some information technology (IT) environments, some types of operations are faster than others. For example, in some implementations, a getInstance operation may be processed much more quickly than an enumerateInstances operation. However, it is not obvious to a client (or to a customer) a priori which operations are processed more quickly than another. For example, a given operation may be processed more quickly in one environment, but processed less quickly in a different environment.

A specific example of a hint, which relates to the Common Information Model (CIM), is now described, as representative of the kinds of hints that can be constructed and employed by embodiments of the present invention. However, those of ordinary skill within the art will recognize that the invention itself is not limited by this example. Rather, the example is presented herein to inform those of ordinary skill within the art of specific and particular examples in relation to which embodiments of the invention can be practiced.

As a concrete example, then, a CIM client may want to obtain CIM instances for a list of volumes, and thereby calls the operation getInstance for each volume. It may have been previously determined during development that, for the given CIM agent handling these operations, more than three getInstance operations performed on the same class as requested by the same client may be better implemented by the client using a single enumerateInstances operation and then filtering the results. As such, the CIM agent detects when the CIM client has issued its fourth getInstance operation, and formulates a hint that is sent back to the client to indicate that any time more than three getInstance operations will be issued, it is more optimal (e.g., more efficient) to instead issue an enumerateInstances operation.

Specifically, the CIM agent formulates an alert indication representative of the hint. The indication can be represented in a markup language, such as the eXtensible Markup Language (XML), as follows:

```
Instance of CIM_AlertIndication {
   AlertType = 3 (Quality of Service Alert)
   PerceivedSeverity = 3 (Degraded/Warning)
   ProbableCause = 47 (Software Error)
   ProbableCauseDescription = "CIM Provider detected three or more
      getInstance of same class; it is better to use enumerateInstances"
   Trending = 0 (Unknown)
   RecommendedActions[ ] = {"Use enumerateInstances instead of
      multiple getInstance calls"}
   EventID = "1234";
   EventTime=20070930T1242.000+360
   ProviderName = "DS 8000 R5.2"
   string MessageID = "EI3421"
   string Message = "CIM Provider detected three or more getInstance of
      same class; it is better to use enumerateInstances"
   string MessageArguments = {"3"}
}
```

In this example alert indication, a unique message identifier is used, "EI3421" to signify the type of hint that is being provided; the MessageArguments being equal to three indicates the maximum number of getInstance operations that should be consecutively received from the CIM client.

The CIM client can then use this information provided in the alert indication, as well as the semantic information "CIM provider detected four or more getInstance of same class; it is better to use enumerateInstances" and "Use enumerateInstances instead of multiple getInstance calls," to more efficiently obtain CIM instances. For example, the CIM client may have predetermined logic that specifies when a hint having the message identifier "EI3421" is received, it should switch to enumerateInstance operations instead of getInstance operations when the CIM client is planning to send more than three getInstance operations in a row (i.e., as specified by the MessageArguments parameter being equal to three). The next time this CIM client needs to request the CIM instances for more than three volumes, therefore, the client will issue an enumerateInstances operation (and filter the results that are returned) instead of more than three getInstance operations.

It is finally noted that embodiments of the invention can be implemented in relation to a computing device, or other type of apparatus, having one or more processors and a computer-readable medium to store one or more computer programs. The processors execute the computer programs from the computer-readable medium. Execution of the computer programs by the processors results in performance of a method. For instance, the method may be any of the methods that have been described above. The computer-readable medium may be a tangible computer-readable medium, such as volatile semiconductor memory, non-volatile storage devices like hard disk drives. and so on. The computing device or other apparatus may have other hardware in addition to the computer-readable medium and the processors.

It is further noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method implemented by computer-executable instructions executable by one or more processors, the method comprising:

receiving a request for information regarding an information technology (IT) managed resource of an IT environment having a plurality of IT managed resources in which the IT managed resources are abstracted using a model by which the IT managed resources are managed as objects within the model and representing the IT managed resources, the request for the information received from a client, the information within the request comprising capabilities and characteristics regarding the IT managed resource as stored within the model, the client adapted to more efficiently manage the IT managed resource using the model based upon the information requested;

analyzing the request for the information to determine whether the request is non-optimal in terms of processing the request to generate the information requested;

in response to determining that the request is non-optimal, constructing a hint indicating how future requests for the information are to be formulated by the client so that the future requests are more optimal in terms of processing the future requests in relation to the model to generate the information requested from the model, as opposed to how to more optimally interact with the IT managed resource itself to use the IT managed resource; and, sending the hint to the client, wherein the request, where the request is non-optimal, results in processing of the request in relation to the model to generate the information requested from the model in a non-optimal manner based on at least how the model is internally structured to respond to the request for the information, and wherein the future requests result in processing of the future requests in relation to the model to generate the information requested from the model in a more optimal manner based on at least how the model is internally structured to respond to the future requests for the information, wherein the information that is a subject of the request is a same information that is a subject of each future request.

2. The method of claim 1, further comprising:
processing the request to generate the information requested; and,
sending the information requested to the client from which the request for the information was received.

3. The method of claim 1, wherein the request is a first request, and the method further comprises:
receiving the hint, the hint received by the client;
generating a second request for information regarding an IT managed resource of the IT environment, the second request for the information generated by the client based on the hint that has been received;
receiving the second request for the information from the client;
processing the second request to generate the information requested; and,
sending the information requested to the client from which the second request for the information was received,
wherein the second request is processed more optimally than the first request due to the second request being generated by the client based on the hint constructed in response to determining that the first request is non-optimal.

4. The method of claim 1, wherein the hint is a first hint, the method is performed by an agent running within the IT environment, and the method further comprises:
analyzing the request for the information to determine whether the information is internally structured by the agent non-optimally in terms of processing the request by the agent to generate the information requested;
in response to determining that the information is internally structured by the agent non-optimally,
constructing a second hint indicating how the information is to be internally structured by the agent more optimally in terms of processing the future requests for the information by the agent to generate the information requested; and,
internally restructuring the information within the agent based on the second hint constructed so that the future request for the information are processed more optimally by the agent to generate the information requested.

5. The method of claim 4, wherein the request is a first request, and the method further comprises:
receiving a second request for information regarding an IT managed resource of the IT environment, the second request for the information received from the client;
processing the second request to generate the information requested; and,
sending the information requested to the client from which the second request for the information was received,
wherein the second request is processed more optimally than the first request due to the information having been internally restructured by the agent based on the second hint constructed in response to determining that the information was previously internally structured within the agent non-optimally.

6. The method of claim 1, wherein the hint is a first hint, and the method further comprises:
analyzing the request for the information to determine whether processing the request to generate the information requested will be non-optimal;
in response to determining that processing the request to generate the information requested will be non-optimal,
constructing a second hint relating to a characteristic that results in processing of the request to generate the information requested to be non-optimal;
logging the second hint within a hint log for offline analysis by a network administrator.

7. The method of claim 6, wherein the second hint indicates how the future requests for the information can be formulated by the client so that the future requests for the information can be processed more optimally to generate the information requested.

8. The method of claim 6, wherein the second hint indicates how the information can be internally structured so that the future requests for the information can be processed more optimally to generate the information requested.

9. The method of claim 6, further comprising:
retrieving the hint log by the network administrator;
analyzing the hint log by the network administrator, including analyzing the second hint within the hint log; and,
adjusting the IT environment so that the future requests for the information are processed more optimally.

10. The method of claim 1, wherein the model is the Common Information Model (CIM).

11. An information technology (IT) environment comprising:
a plurality of IT managed resources abstracted using a model by which the IT managed resources are managed as objects within the model and representing the IT managed resources, at least one of the IT managed resources being a hardware resource; and,
an agent running on a selected resource of the IT managed resources, the agent to:
store information regarding the selected resource, the information comprising capabilities and characteristics regarding the IT managed resource as stored within the model;
receive a request for the information from a client, the client adapted to more efficiently manage the IT managed resource using the model based upon the information requested;
determine whether the information is internally structured by the agent non-optimally in terms of processing the request to generate the information requested;
construct a hint indicating how the information is to be internally structured by the agent more optimally in terms of processing future requests for the information in relation to the model to generate the information requested from the model, as opposed to how to more optimally interact with the IT managed resource itself to use the IT managed resource; and,
internally restructure the information within the agent based on the hint constructed,
wherein the request, where the request is non-optimal, results in processing of the request in relation to the model to generate the information requested from the model in a non-optimal manner based on at least how the model is internally structured to respond to the request for the information, and wherein the future requests result in processing of the future requests in relation to the model to generate the information requested from the model in a more optimal manner based on at least how the model is internally structured to respond to the future requests for the information, wherein the information that is a subject of the request is a same information that is a subject of each future request.

12. The IT environment of claim 11, wherein the agent comprises a processing component to process the request to generate the information requested, and to send the information requested to the client from which the request for the information was received.

13. The IT environment of claim 11, wherein the agent comprises an analysis component, a hint component, and a processing component, wherein the analysis component is to:
determine whether the information is internally structured by the agent non-optimally in terms of processing the request to generate the information requested; and,
send results of the determination to the hint component, wherein the hint component is to:
receive results of the determination from an analysis component of the agent;
construct the hint indicating how the information is to be internally structured by the agent more optimally in terms of processing the future requests for the information to generate the information requested; and,
send the hint to the processing component, and wherein the processing component is to:
receive the hint from a hint component of the agent; and,
internally restructure the information within the agent based on the hint.

14. The IT environment of claim 11, wherein the hint is a first hint, and the agent is further to:
determine whether the request is non-optimal in terms of processing the request to generate the information requested;
construct a second hint indicating how the future requests for the information are to be formulated by the client so that the future requests are optimal in terms of processing the future requests to generate the information requested; and,
send the second hint to the client.

15. The IT environment of claim 14, wherein the agent comprises an analysis component and a hint component, wherein the analysis component is to:
determine whether the request is non-optimal in terms of processing the request to generate the information requested; and,
send results of the determination to the hint component, and wherein the hint component is to:
receive results of the determination from an analysis component of the agent;
construct the second hint indicating how the future requests for the information are to be formulated by the client so that the future requests are optimal in terms of processing the future requests to generate the information requested; and,
send the second hint to the client.

16. The IT environment of claim 11, further comprising a non-volatile computer-readable medium storing a hint log, wherein the hint is a first hint, and the agent is to:
determine that processing the request to generate the information requested will be non-optimal;
construct a second hint relating to a characteristic that results in processing of the request to generate the information requested to be non-optimal; and,
log the second hint within the hint log for offline analysis by a network administrator.

17. The IT environment of claim 16, wherein the agent comprises an analysis component and a hint component, wherein the analysis component is to:
analyze the request for the information to determine whether processing the request to generate the information requested will be non-optimal; and,
send results of the determination to the hint component, and wherein the hint component is to:
construct the second hint indicating the characteristic that results in processing of the request to generate the information requested to be non-optimal; and,
log the second hint within the hint log for offline analysis by the network administrator.

18. The IT environment of claim 11, wherein the model is the Common Information Model (CIM).

19. A non-transitory computer-readable medium having one or more computer programs stored thereon for execution by one or more processors to perform a method operable within an information technology (IT) environment, the method performed by an agent running within the IT environment, the method comprising:
receiving a request for information regarding an information technology (IT) managed resource of the IT environment having a plurality of IT managed resources in which the IT managed resources are abstracted using a model by which the IT managed resources are managed as objects within the model and representing the IT managed resources, the request for the information received from a client, the information within the request comprising capabilities and characteristics regarding the IT managed resource as stored within the model, the client adapted to more efficiently manage the IT managed resource using the model based upon the information requested;
analyzing the request for the information to determine whether the request is non-optimal in terms of processing the request to generate the information requested;
in response to determining that the request is non-optimal, constructing a first hint indicating how future requests for the information are to be formulated by the client so that the future requests are more optimal in terms of processing the future requests in relation to the model to generate the information requested from the model, as opposed to how to more optimally interact with the IT managed resource itself to use the IT managed resource;
sending the first hint to the client;
analyzing the request for the information to determine whether the information is internally structured by the agent non-optimally in terms of processing the request by the agent to generate the information requested;
in response to determining that the information is internally structured by the agent non-optimally, constructing a second hint indicating how the information is to be internally structured by the agent more optimally in terms of processing the future requests for the information by the agent to generate the information requested;

internally restructuring the information within the agent based on the second hint constructed so that the future request for the information are processed more optimally by the agent to generate the information requested;

analyzing the request for the information to determine whether processing the request to generate the information requested will be non-optimal;

in response to determining that processing the request to generate the information requested will be non-optimal, constructing a third hint relating to a characteristic that results in processing of the request to generate the information requested to be non-optimal;

logging the third hint within a hint log for offline analysis by a network administrator, wherein the request, where the request is non-optimal, results in processing of the request in relation to the model to generate the information requested from the model in a non-optimal manner based on at least how the model is internally structured to respond to the request for the information, and wherein the future requests result in processing of the future requests in relation to the model to generate the information requested from the model in a more optimal manner based on at least how the model is internally structured to respond to the future requests for the information, wherein the information that is a subject of the request is a same information that is a subject of each future request.

20. The non-transitory computer-readable medium of claim 19, wherein the model is the Common Information Model (CIM).

* * * * *